(12) United States Patent
Arnott

(10) Patent No.: US 8,292,306 B1
(45) Date of Patent: Oct. 23, 2012

(54) MOUNT AND BEARING FOR SHOCK ABSORBER

(75) Inventor: Adam Arnott, Cape Canaveral, FL (US)

(73) Assignee: Arnott, Inc., Cape Canaveral, FL (US)

( * ) Notice: Subject to any disclaimer, the term of this patent is extended or adjusted under 35 U.S.C. 154(b) by 188 days.

(21) Appl. No.: 12/827,122

(22) Filed: Jun. 30, 2010

(51) Int. Cl.
*B60G 17/04* (2006.01)

(52) U.S. Cl. ....... 280/6.157; 280/124.155; 280/124.159; 267/64.28; 188/322.21

(58) Field of Classification Search ............... 280/6.157, 280/124.154, 124.155, 124.158, 124.159; 267/64.28, 64.11, 64.16, 195, 217; 188/266, 188/322.21, 322.19, 322.16, 322.17, 322.18
See application file for complete search history.

(56) References Cited

U.S. PATENT DOCUMENTS

| | | | |
|---|---|---|---|
| 2,324,058 A | 7/1943 | Boor et al. | |
| 2,571,279 A | 10/1951 | Myklestad | |
| 3,024,875 A | 3/1962 | Stulz | |
| 3,776,536 A * | 12/1973 | Henderson | 267/35 |
| 4,022,448 A * | 5/1977 | Reeder | 267/226 |
| 4,502,673 A * | 3/1985 | Clark | 267/64.24 |
| 4,560,042 A | 12/1985 | Sell et al. | |
| 4,566,565 A | 1/1986 | Wicke | |
| 4,664,234 A | 5/1987 | Wight et al. | |
| 5,172,794 A | 12/1992 | Ward | |
| 5,458,219 A | 10/1995 | Anderson | |
| 5,518,225 A * | 5/1996 | Gubitz | 267/64.24 |
| 5,636,831 A * | 6/1997 | Gubitz | 267/64.24 |
| 5,669,597 A * | 9/1997 | Rittstieg et al. | 267/64.17 |
| 5,833,036 A | 11/1998 | Gillespie | |
| 6,244,398 B1 | 6/2001 | Girvin et al. | |
| 6,328,292 B1 * | 12/2001 | Jarstad | 267/64.21 |
| 6,343,781 B1 * | 2/2002 | Joseph | 267/64.11 |
| 6,374,966 B1 | 4/2002 | Lillbacka | |
| 6,581,918 B2 * | 6/2003 | Voelkel | 267/64.27 |
| 6,648,309 B2 | 11/2003 | Beck | |
| 6,845,973 B2 * | 1/2005 | Ferrer | 267/64.24 |
| 7,017,893 B1 * | 3/2006 | Vincenzo | 267/226 |
| 2002/0163111 A1 * | 11/2002 | Voelkel | 267/64.27 |
| 2005/0200058 A1 * | 9/2005 | Voelkel | 267/64.11 |
| 2007/0126163 A1 * | 6/2007 | Leonard et al. | 267/64.27 |

OTHER PUBLICATIONS

Land Rover Air Suspension Parts, Range Rover—2003-2006 (4.4 & 4.2 SC) L322, MK-III, retrieved from www.arnottindustries.com/part_LAND_ROVER_Air_Suspension_PArts_yid4_pid12..., retrieved on Jun. 28, 2010.

* cited by examiner

*Primary Examiner* — Drew Brown
(74) *Attorney, Agent, or Firm* — Brian S. Steinberger; Law Offices of Brian S. Steinberger, P.A.

(57) ABSTRACT

Improved mount and bearing height adjustable air suspension shock absorber devices, apparatus, systems and methods, for use with sport utility vehicles(SUVs) such as Range Rovers®, and the like. Air lines run through an upper mount into an upper opening of an inflatable and deflatable airbag. The airlines have not external lines such as the nylon type tubing used in the prior art, and are not prone to failure which occurs more frequently with the external tubing air lines. Inflating and deflating the air springs/airbags (bladders) allows for the shock absorbers in the devices to be adjusted to different riding conditions over different types of terrains giving the rider a customized ride over different types of on road and off-road terrains. An internal air line machined into the head of the air suspension device provides a direct passageway for compressed air to pass into and out of the airbag without using external tubes. Sealing members such as O-rings provide airtight seals between the moving members of the head components of the air suspension devices.

15 Claims, 10 Drawing Sheets

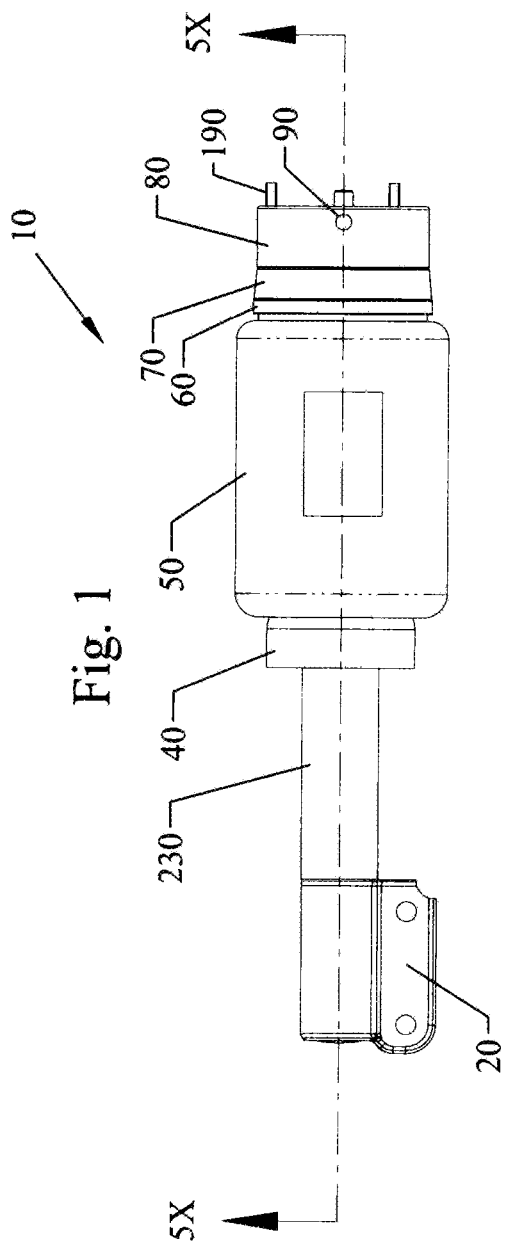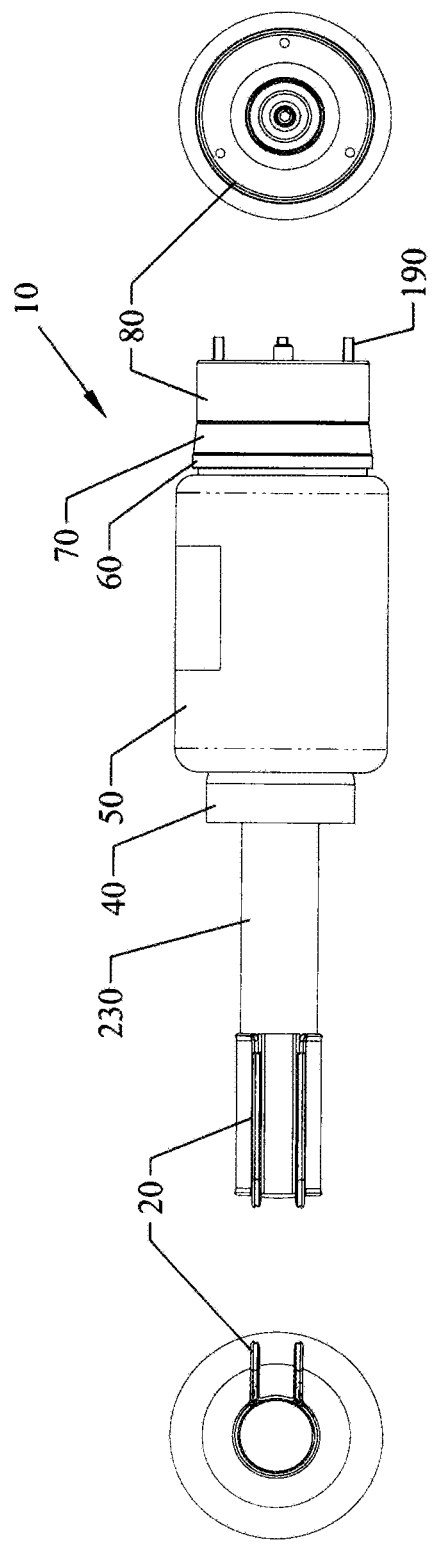
Fig. 1
Fig. 2
Fig. 3
Fig. 4

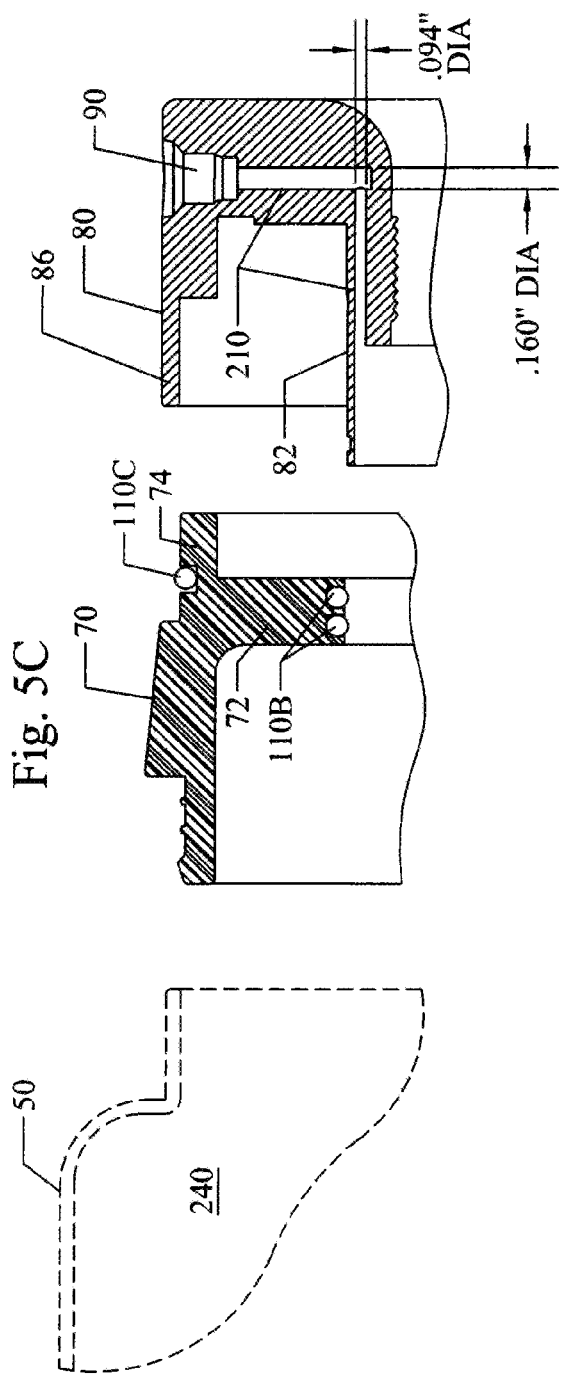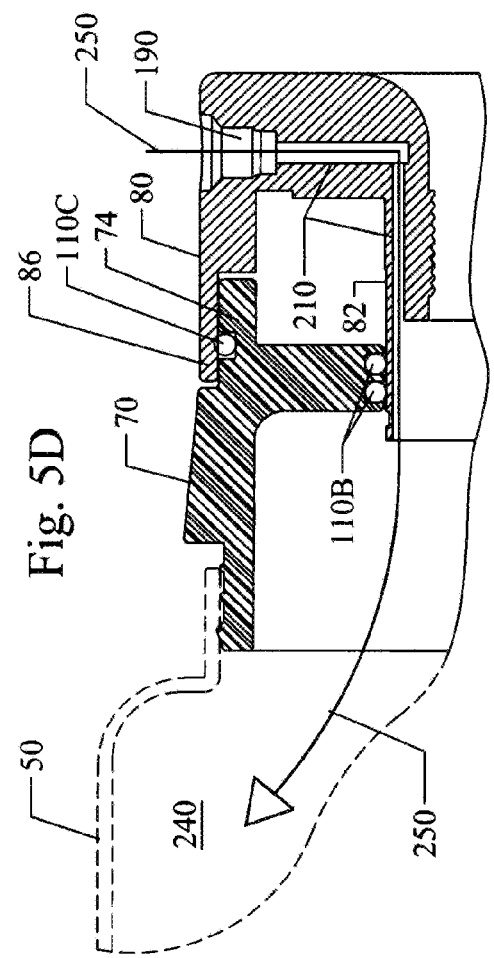

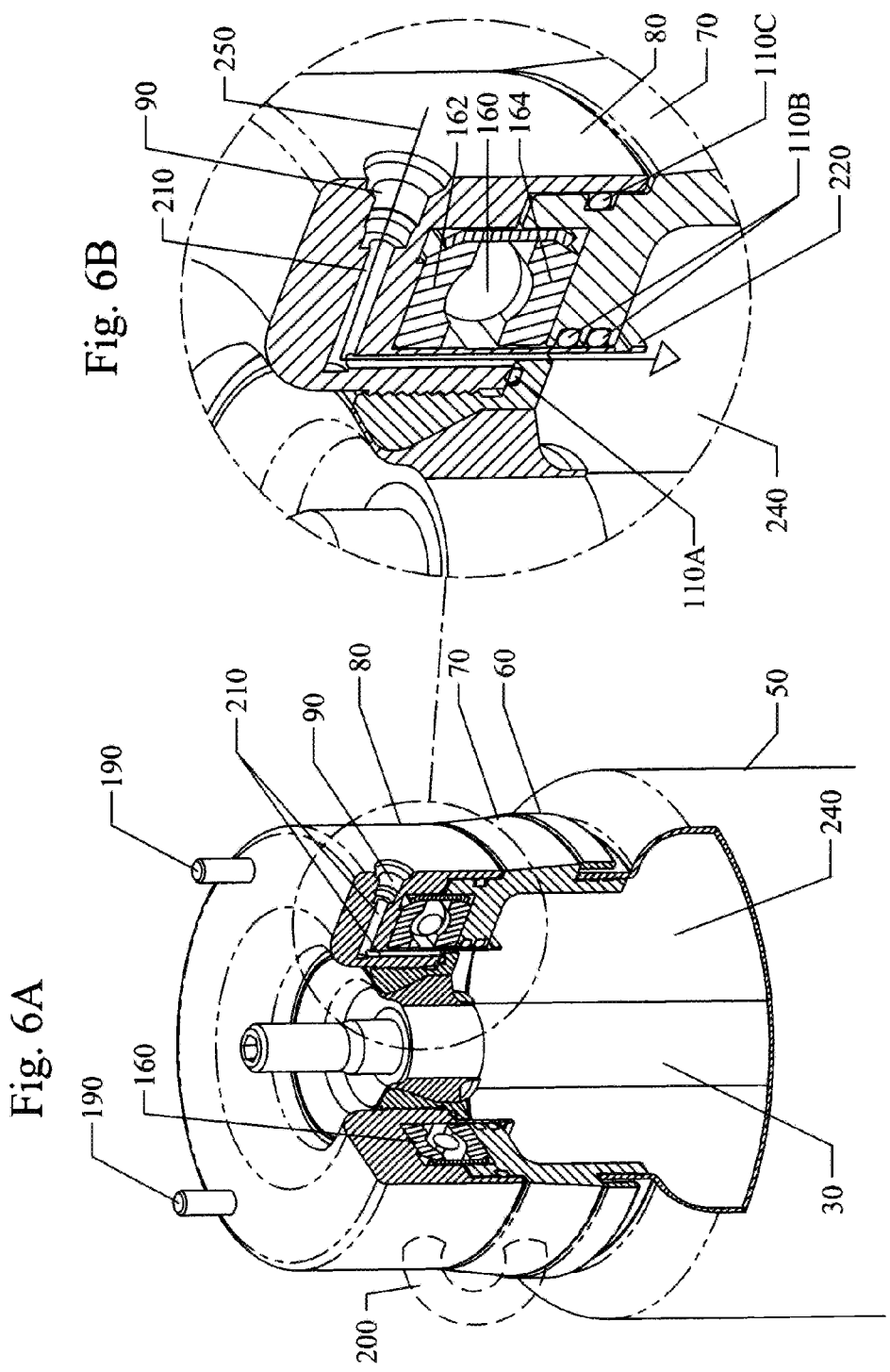

MOUNT AND BEARING FOR SHOCK ABSORBER

This invention relates to air suspension shocks, in particular to improved mount and bearing height adjustable air suspension shock absorber devices, apparatus, systems and methods, for sport utility vehicles(SUVs) such as Range Rovers®, and the like.

BACKGROUND AND PRIOR ART

Luxury sport utility vehicles(SUVs) such as the Range Rover® manufactured by the Land Rover Company in the United Kingdom, are known for comfortable rides in on and off-road ride applications. This has generally been achieved by four wheel independent height adjustable air suspension which allows for variable ride height for both on and off-road conditions. The driver can control the height adjustable suspension which is often used for traveling through rough riding terrain. The height adjustable air suspension systems are controlled by the driver running over rough terrain.

These sophisticated types of air suspension systems can have numerous problems, such as air bag failure, air line failure, compressor failure and dryer type failures.

Air bag type failures can be caused by wet rot, due to old age, or moisture within the air system that damages it from the inside. Air ride suspension parts can fail because rubber dries out. Punctures to the air bag can be caused from debris on the road. Improper installation can cause the air bags to rub against the vehicle's frame or other surrounding parts, damaging it. Overextension of an air spring which is not constrained by other suspension components such as a shock absorber may also lead to the premature failure of an air spring through the tearing of the flexible layers.

Air line failure is a failure of the tubing which connects the air bags or struts to the rest of the air system, and such as a DOT (Department of Transportation)-approved nylon air brake line. This type of failure can occur when air lines, which must be routed to the air bags through the chassis of the vehicle, rub against a sharp edge of a chassis member or a moving suspension component, causing a hole to be formed. This mode of failure will typically take some time to occur after the initial installation of the system as the integrity of a section of air line is compromised to the point of failure due to the rubbing and resultant abrasion of the material. An air line failure may also occur if a piece of road debris hits an air line and punctures or tears it. Air line failure can also occur by the exposed air line between the air bag and upper mount constantly bending and twisting over time due to use of the bags and upper mounts that move relative to one another in the air suspension system.

Compressor failure is primarily due to leaking air springs or air struts. The compressor can burn out trying to maintain the correct air pressure in a leaking air system. Compressor burnout can also be caused by moisture from within the air system coming into contact with electronic parts.

In Dryer failure the dryer, which functions to remove moisture from the air system, can eventually become saturated and unable to perform that function. This can cause moisture to build up in the system and can result in damaged air springs and/or a burned out compressor.

Currently local dealerships charge over $1,200 for each air suspension component(shock). Multiplying this number by four raises the cost to some $4,800 per vehicle which is quite expensive. Thus, the need exists for solutions to the above problems with the prior art.

SUMMARY OF THE INVENTION

A primary objective of the present invention is to provide improved mount and bearing height adjustable air suspension shock absorber devices, apparatus, systems and methods, for sport utility vehicles(SUVs) such as Range Rovers® and the like, that are less expensive and more efficient than dealer produced shock absorbers.

A secondary objective of the present invention is to provide improved mount and bearing height adjustable air suspension shock absorber devices, apparatus, systems and methods, for sport utility vehicles(SUVs) such as Range Rovers® and the like, having no external airline hose between the upper mount and the inflatable air bag.

A third objective of the present invention is to provide improved mount and bearing height adjustable air suspension shock absorber devices, apparatus, systems and methods, for sport utility vehicles(SUVs) such as Range Rovers® and the like, having internal airline connections between the upper mount and the inflatable air bag.

A fourth objective of the present invention is to provide improved mount and bearing height adjustable air suspension shock absorber devices, apparatus, systems and methods, for sport utility vehicles(SUVs) such as Range Rovers® and the like, having a greater lifespan than current shock absorbers.

A preferred embodiment of the height adjustable fluid suspension system for vehicles, can include an upper mount for being attached to a frame of vehicle, a lower mount for being attached to a wheel on the vehicle, an adjustable airbag having a closed bottom and closed sidewalls and an upper opening for allowing air to move into and out of the airbag, the airbag being attached between the upper mount and the lower mount, the airbag being adjustably inflated and deflated for raising and lowering the vehicle over ground surfaces, and an internal airline having an external input end, with the air line running through the upper mount and into the opening of the airbag, wherein compressed air passes from the external air line through the upper mount and into the airbag.

The vehicle can be a sport utility vehicle such as a Range Rover®.

The internal air line can be machined through the upper mount.

The upper mount can include a top mount member for being fixably attached to the frame, a piston fixably attached to an upper end of the airbag. rotating members for allowing the piston to rotate relative to the top mount member, and sealing members for providing an airtight seal between the airbag and the upper mount. The rotating members can be ball bearings. The sealing members can be O-rings.

The internal air line can include a horizontal passage and a vertical passage. The horizontal passage can have a diameter of approximately 0.160 inches, and the vertical passage can have a diameter of approximately 0.094 inches.

A height adjustable fluid suspension system for vehicles, can be limited to consisting of an upper mount for being attached to a frame of a sport utility vehicle, wherein the upper mount has a top mount member for being fixably attached to the frame, a piston fixably attached to an upper end of the airbag, rotating members for allowing the piston to rotate relative to the top mount member, and sealing members for providing an airtight seal between the airbag and the upper mount, a lower mount for being attached to a wheel on the vehicle, an adjustable airbag having a closed bottom and closed sidewalls and an upper opening for allowing air to move into and out of the airbag, the airbag being attached between the upper mount and the lower mount, the airbag being adjustably inflated and deflated for raising and lowering the vehicle over ground surfaces, and an internal airline machined into the upper mount having an external input end and a horizontal passage with a diameter and a vertical passage with a diameter, the diameter of the horizontal passage being larger than the diameter of the vertical passage, with the air line running through the upper mount and into the opening of the airbag, wherein compressed air is limited to passing from the external air line through the upper mount and into the airbag. The rotating members can be ball bearings, and the sealing members can be O-rings.

A preferred method of adjusting fluid suspensions in a vehicle, can include the steps of providing a four wheeled vehicle with a frame having height adjustable suspension, providing height adjustable fluid suspension devices for each wheel, attaching upper ends of the suspension devices to the frame of the vehicle, rotatably attaching pistons to the upper ends of the air suspension device, sealing the pistons to the upper ends of the air suspension devices, attaching an upper end of airbags to the pistons, attaching lower ends of the airbags to lower mounts, attaching the lower mounts to each of the wheels, and inflating and deflating the airbags by passing air through the upper ends and the pistons of the air suspension devices into the airbags without any external lines located outside of the upper ends and the pistons.

The method can further include the step of machining an air line through the upper ends and the pistons of the air suspension devices to provide air passageways into the air bags. The machining step can include machining both a horizontal passageway and a vertical passageway with the horizontal passageway having a larger diameter than the vertical passageway.

The step of rotatably attaching can include the step of providing ball bearings between the pistons and the upper ends of the air suspension devices. The step of sealingly attaching can include the step of providing O-rings between the pistons and the upper ends of the air suspension devices.

Further objects and advantages of this invention will be apparent from the following detailed description of the presently preferred embodiments which are illustrated schematically in the accompanying drawings.

BRIEF DESCRIPTION OF THE FIGURES

FIG. 1 is a top view of the air shock assembly of the invention.

FIG. 2 is a front side view of the air shock assembly of FIG. 1.

FIG. 3 is a right end view of the air shock assembly of FIG. 2.

FIG. 4 is a left end view of the air shock assembly of FIG. 2.

FIG. 5C is an exploded view of the airbag, piston and top mount of FIG. 5B.

FIG. 5D shows the airbag, piston and top mount of FIG. 5C attached to one another.

FIG. 6A is a top perspective view of the head of the air assembly in partial cut-away.

FIG. 6B is an enlarged view of the air passage in the head of FIG. 6A.

DESCRIPTION OF THE PREFERRED EMBODIMENTS

Figure 5A:
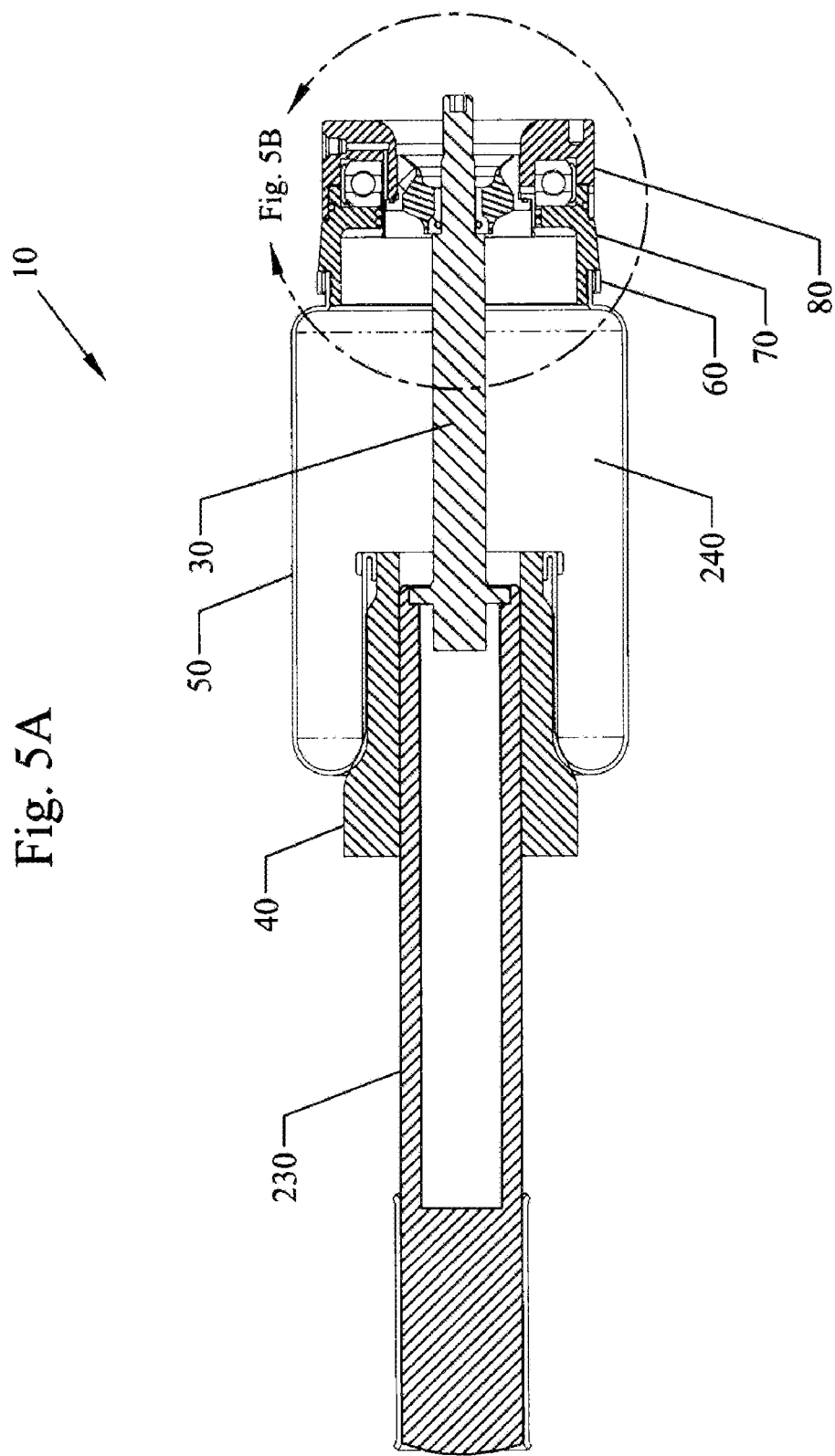
FIG. 5A is a cross-sectional view of the air shock assembly of FIG. 1 along arrows 5X.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A list of the components will now be described.
10. Air shock assembly of the invention
10P. Prior art air shock assembly with external airline tube 200
20. Mounting flange. Mounts shock to wheel.
30. Internal shock
40. Bottom piston
50. Airbag
60. Airbag crimp ring, large.
70. Top (upper) mount piston
72. Inner protruding piston end
74. External upper side with groove for O-ring in upper piston 70
80. Top (upper) mount. Mounts to vehicle chassis and does not rotate when the wheel turns.
82. Inner top mount wall
86. Lower end(lip) of top mount 80
90. Air fitting inlet for inflating air bag.
100. Airbag crimp ring, small.
110A. O-ring seal about upper end of shock member
110B. Pair of O-ring seals between inner protruding
120. Outer shock mount
130. Tire (Prior Art)
135. Tire axle flange
140. Suspension (Prior Art)
150. Mounting hardware.
160. Ball bearings
162. Upper race
164. Lower race
170. This portion of the air shock rotates when the wheel turns.
180. Air line for inflating airbag.
190. Mount stud for securing top mount of air shock to vehicle chassis.
200. Tube used to illustrate prior method of providing an air passage between the top portion of the air shock assembly (which does not rotate with the wheel) to the lower portion of the air shock assembly (which does rotate with the wheel).
210. Internal machined air passage in top mount.
220. Snap ring 230. Strut housing
240. Inside of airbag.
250. The path that the air from the air line travels through the top mount and top mount piston into the inside of the air bag.

FIG. 1 is a top view of the air shock assembly 10 of the invention. FIG. 2 is a front side view of the air shock assembly 10 of FIG. 1. FIG. 3 is a right end view of the air shock assembly 10 of FIG. 2. FIG. 4 is a left end view of the air shock assembly 10 of FIG. 2. Referring to FIGS. 1-4, the air shock assembly 10 can include an upper mount stud 190 for attaching the top(upper) mount 80 to a vehicle chassis and does not rotate when the wheel turns as will be shown later in FIGS. 8 and 10-15. Below the upper mount 80 is a top mount piston 7, and an airbag crimp ring 60 which attaches to the upper open end of the airbag 50. Below the airbag 50 is a bottom piston 40 that is attached to a strut housing 230 which is further attached to a mounting flange 20 that mounts the shock assembly 10 to the wheel of the vehicle.

Figure 5B:
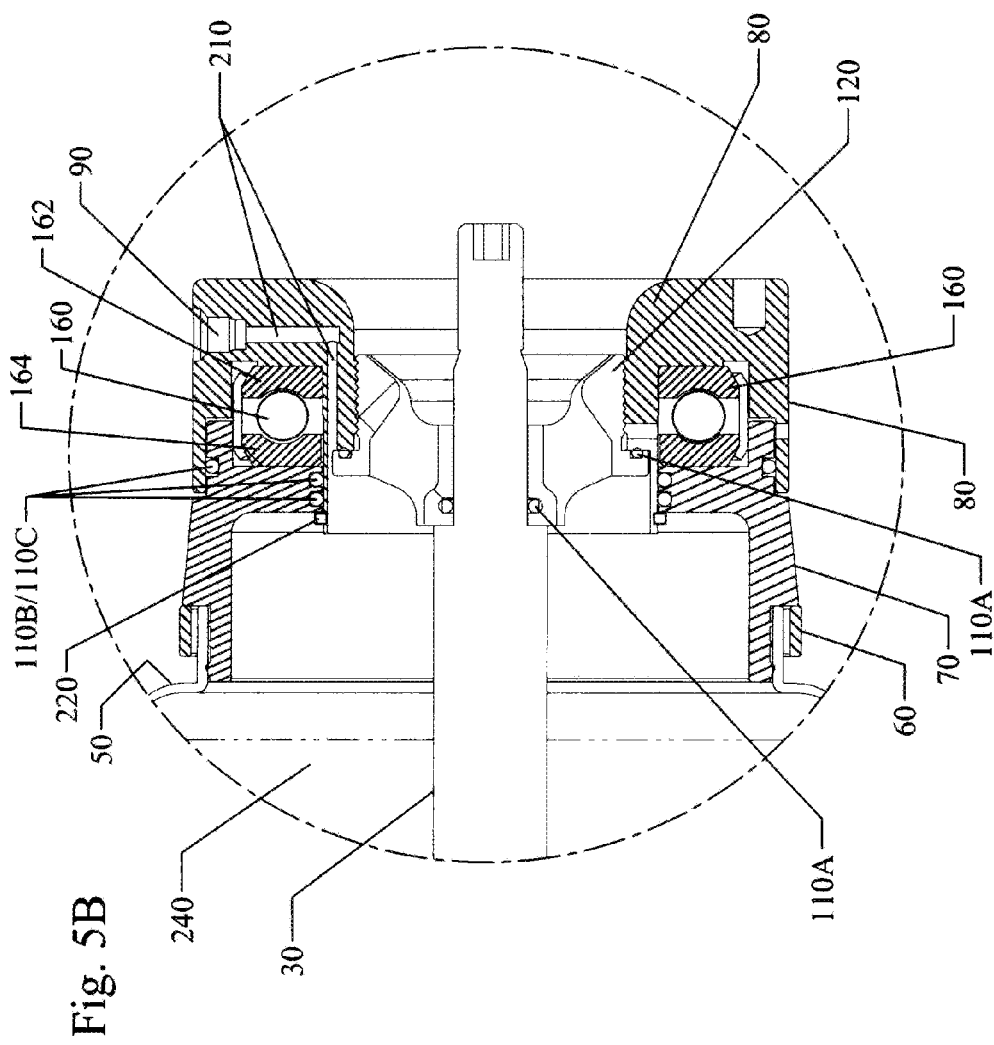
FIG. 5B is an enlarged view of the top mount section of the air shock assembly of FIG. 5A.

FIG. 5A is a cross-sectional view of the air shock assembly 10 of FIG. 1 along arrows 5X. FIG. 5B is an enlarged view of the top mount section of the air shock assembly 10 of FIG. 5A. FIG. 5C is an exploded view of the airbag 50, top piston 70 and top mount 80 of FIG. 5B. FIG. 5D shows the airbag 50, top piston 70 and top mount 80 of FIG. 5C attached to one another.

Figure 7:
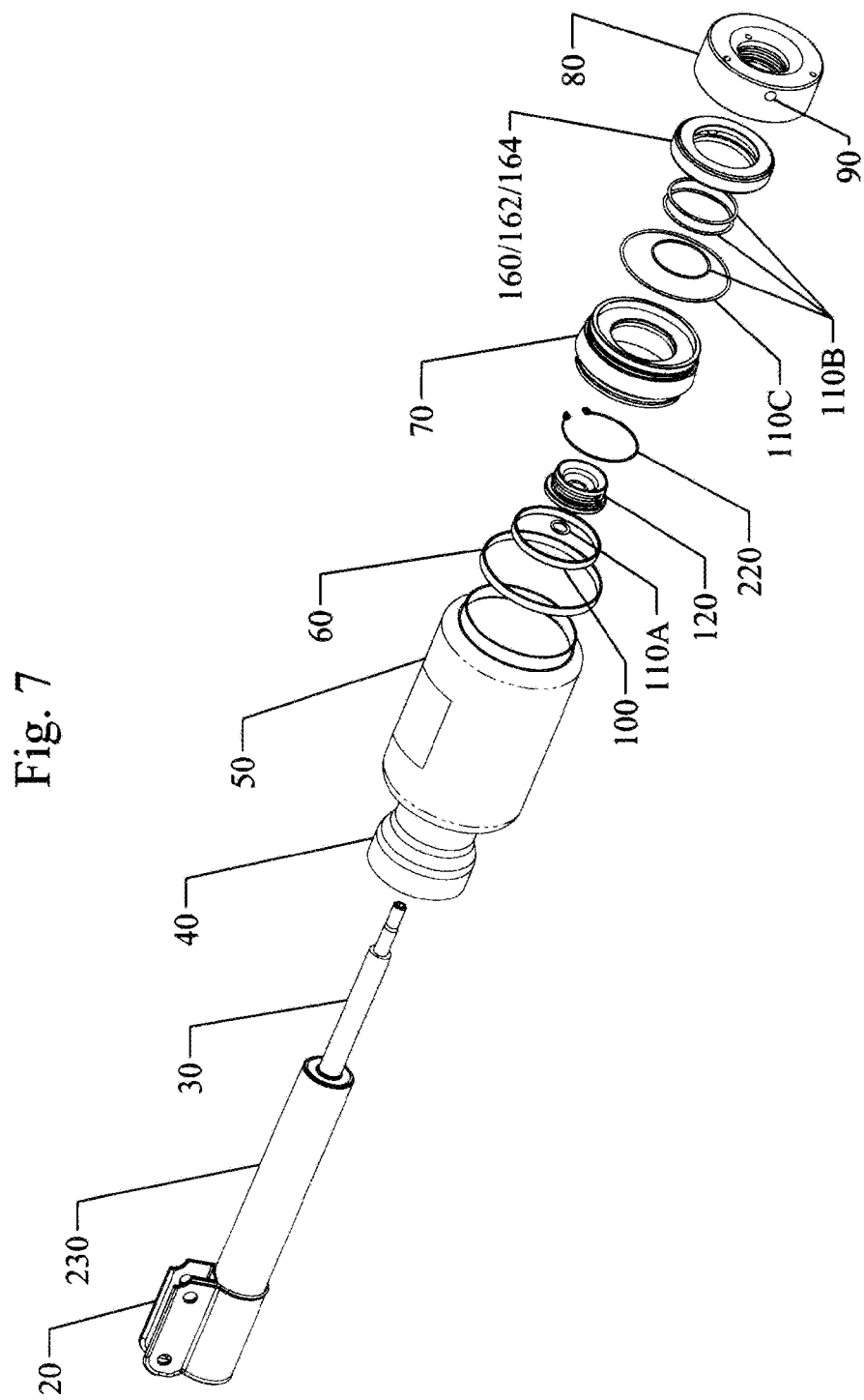
FIG. 7 is an exploded view of the air shock assembly of the preceding figures.

FIG. 6A is a top perspective view of the head of the air assembly in partial cut-away. FIG. 6B is an enlarged view of the internal air passage 210 in the head of FIG. 6A. FIG. 7 is an exploded view of the air shock assembly 10 of the preceding figures showing the lower mounting flange 20, strut housing 230, internal shock member 30, bottom piston 40 airbag 50, large airbag crimp ring 60 small airbag crimp ring 100, O-ring seals 110A, 110B, 110C, outer shock mount 120, snap ring 220, top mount piston 70, ball bearing assembly (ball bearings, upper and lower races), 160, 162, 164, top mount 80 and air fitting inlet 90.

Referring to FIGS. 5A-7, the internal shock member 30 is shown inside of the airbag 50. About the upper end of the internal shock member 30 can be an O-ring seal 110A surrounding the member 30 (shown more clearly in FIGS. 5A-5D). A pair of O-rings 110B can be located between inner protruding piston end 72 of top mount piston 70 and inner top mount wall 82 of top mount 80. Another O-ring 110C can be located between an inside wall of lower end 86 of top mount 80 and the external upper side 74 with groove for O-ring in the upper piston 70. A snap ring 220 can wrap about the outside of the inner top mount wall 82. The O-rings 110A, 110B, 110C allow for air tight seals between the movement of the associated parts so that no air escapes from the head of the air assembly 10.

A large airbag crimp ring 60 can lock and seal the upper end of the air bag 50 to the top mount piston 70, with a small air bag crimp ring 100.

An air fitting inlet 90 can be located in the outer upper side of the top mount 80 as an air inlet port to follow through an internal machined air passage 210 through the top mount 80. The air passage 210 can run in a horizontal direction having a diameter of approximately 0.160 inches from the air inlet port 90 to a vertical direction having a diameter of approximately 0.094 inches. The dimensions have been tested. Unlike the prior art external tube, the machined passageways do not fail overtime from wear and tear. Arrow 250 shows the path that the air from the airline travels through the top mount 80 and top mount piston 70 into the upper open end of the airbag 50 and into the inside 240 of the airbag 50.

The breakout sectional views in FIGS. 6A-6B of the head of the air shock assembly 10 illustrate the air path 210 that is integrally machined into the top mount 80. Also shown are the o-ring seals 110A, 110B, 110C that keep the air from escaping from the airbag 50 after inflation. Ball bearings 160 located between an upper race 162 and lower race 164 allow rotation between the top(upper) mount 80 and the top mount piston 70. As shown in FIG. 6A, the prior art tube 200 is shown which will be described in more detail in FIGS. 10-12.

Figure 8:
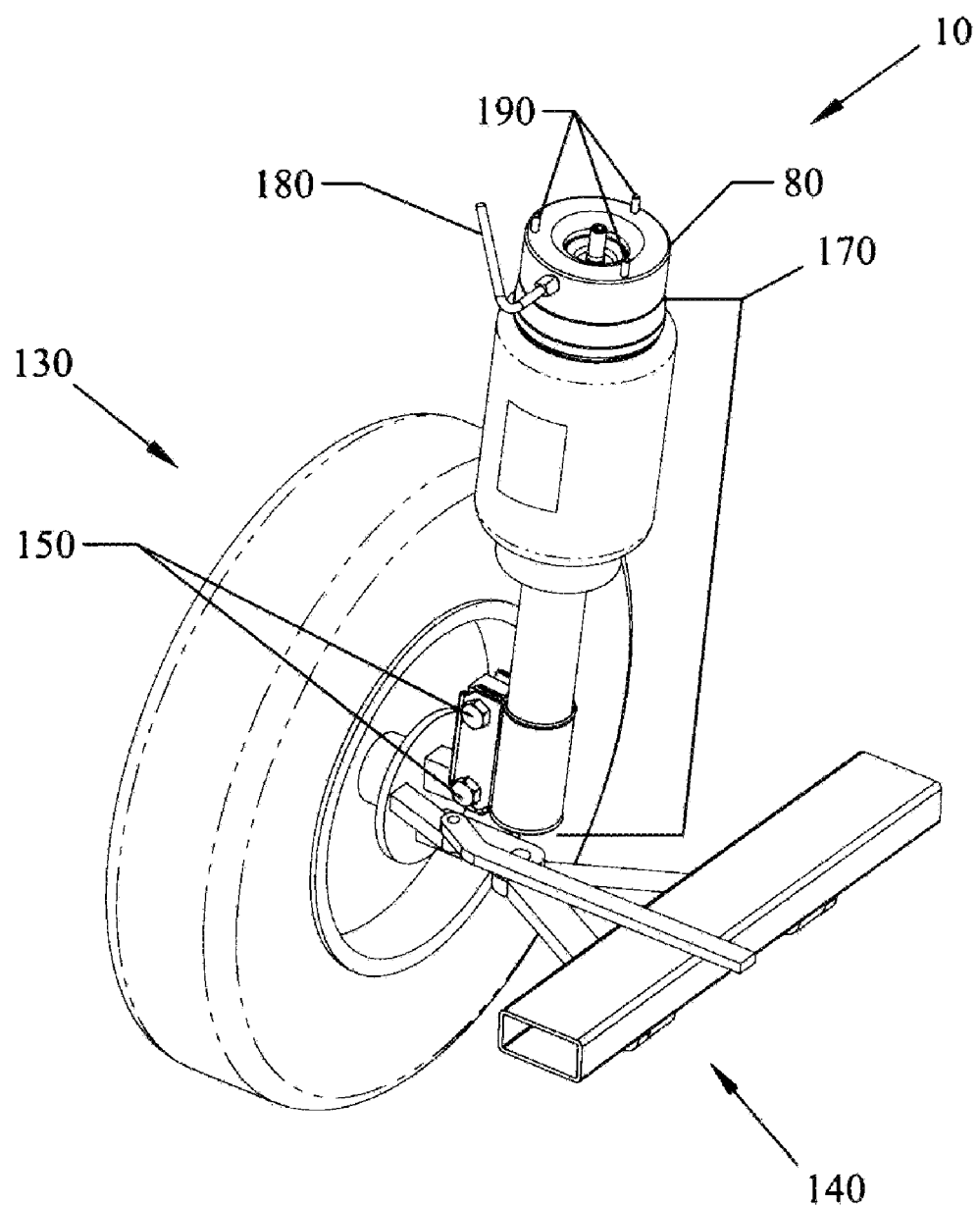
FIG. 8 is a perspective view of an air shock assembly of FIG. 7 mounted into a wheel and suspension configuration.

FIG. 8 is a perspective view of an air shock assembly 10 of FIG. 7 mounted into a wheel and suspension configuration with the wheel 130 attached to the vehicle suspension frame 140. The head mount of the air shock assembly 10 would be secured to the vehicle chassis (not shown) by the mount studs 190. As shown in FIG. 8, the lower parts 170 of the air shock assembly 10 rotates while when the wheel 130 is turned to the right or turned to the left, and the mount stud 190 and top mount remain stationary while attached to the lower part of the vehicle chassis.

Figure 9:
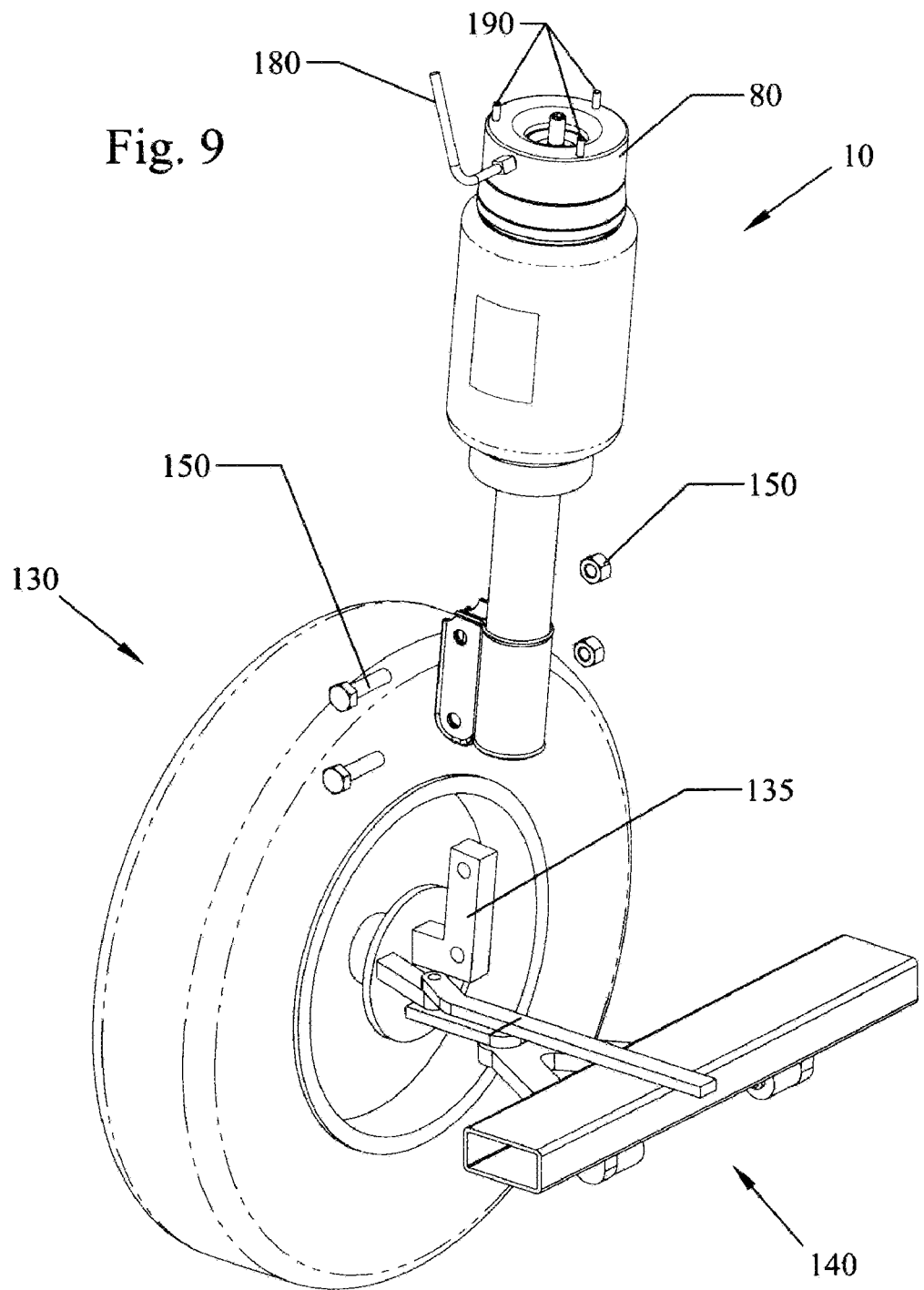
FIG. 9 is a perspective view of the air shock assembly of FIG. 8 exploded from the wheel.

FIG. 9 is a perspective view of the air shock assembly 10 of FIG. 8 exploded from the wheel(tire) 130. Mounting hardware 150 such as bolts and nuts can attach the mounting flange 20 to the tire axle flange 135.

Figure 10:
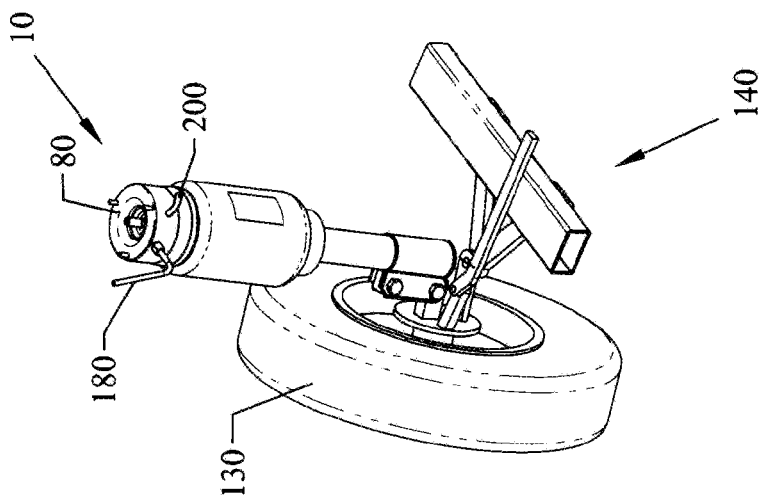
FIG. 10 is a prior art perspective view of the suspension assembly with air shock with the prior art external tube.
Figure 11:
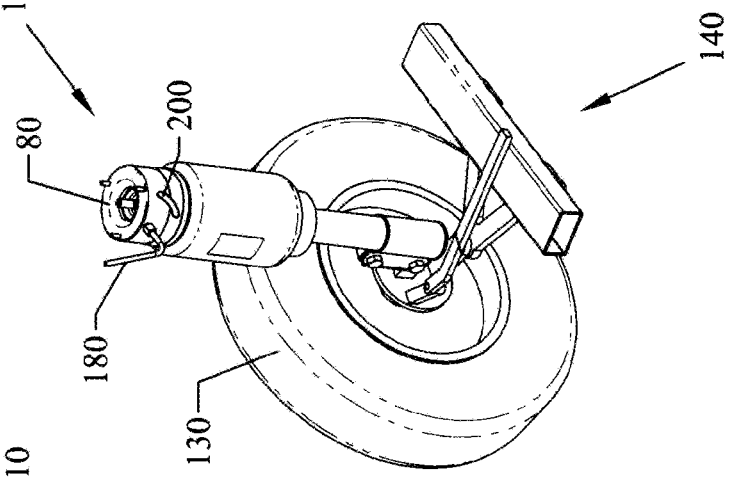
FIG. 11 is another prior art perspective view of the suspension assembly of FIG. 10 with the wheel turned to the right.
Figure 12:
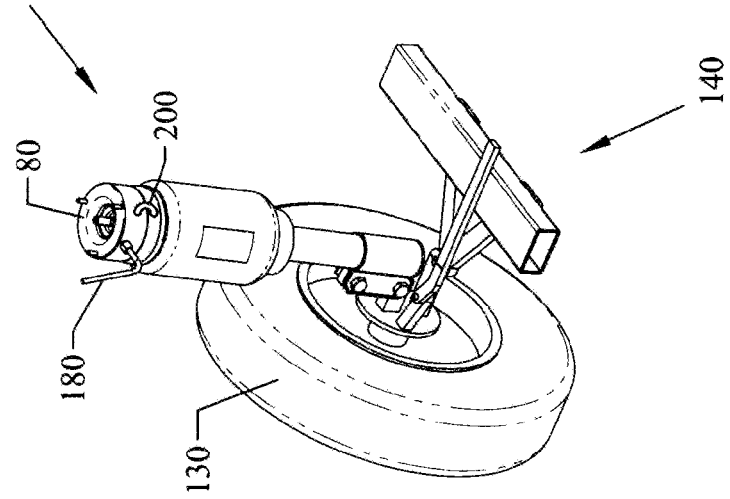
FIG. 12 is another prior art perspective view of the suspension assembly of FIG. 10 with the wheel turned to the left.

FIG. 10 is a prior art perspective view of the suspension assembly 10P with air shock with the prior art external tube 200. An external airline 180 can feed air from a compressor to pass into the top mount 80 where the external tube 200 then allows for the compressed air to pass from the top mount 80 into the top piston 70 and into the air bag 50 (as shown in FIG. 6A). The wheel 130 is pointing forward in this figure. The external tube 200 establishes the air path into the airbag 50. This configuration is to illustrate the basic concept of how this is accomplished in current designs. FIG. 11 is another prior art perspective view of the suspension assembly 10P of FIG. 10 with the wheel 130 turned to the right. The lower portion of the shock assembly 10P can be seen turning clockwise while the top mount remains unmoved. FIG. 12 is another prior art perspective view of the suspension assembly 10P of FIG. 10 with the wheel 130 turned to the left. The lower portion of the shock assembly 10P can be seen turning counter-clockwise while the top mount remains unmoved.

Figure 13:
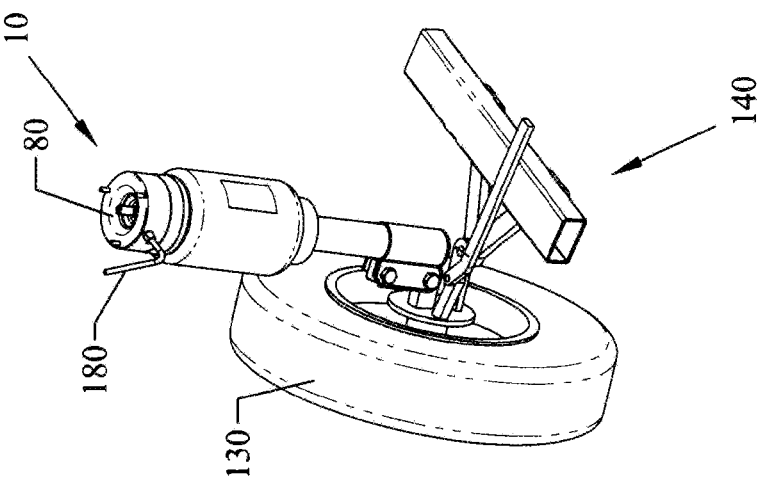
FIG. 13 is a perspective view of the suspension assembly of the invention wheel shown without the external tube used in the prior art.
Figure 14:
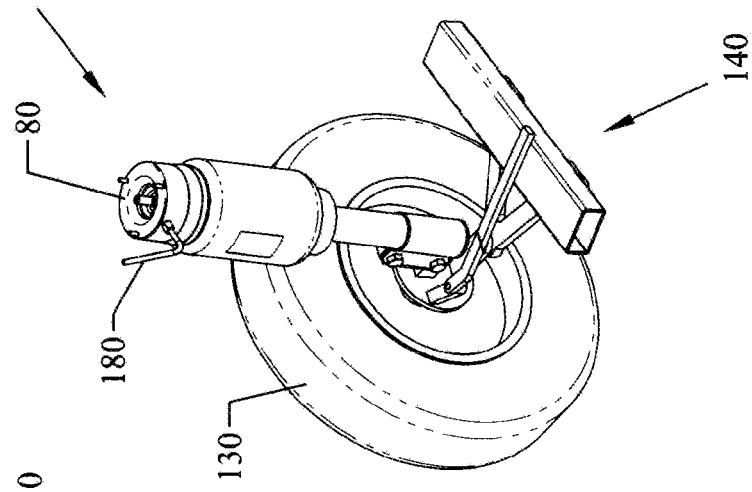
FIG. 14 is another perspective view of the invention suspension assembly of FIG. 13 with the wheel turned to the right.
Figure 15:
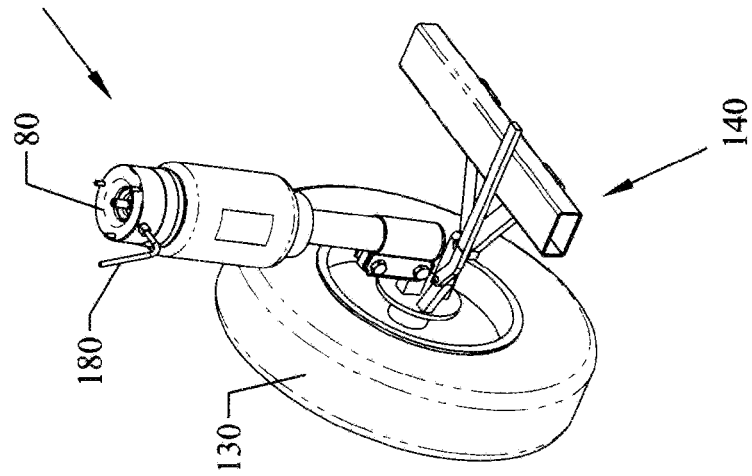
FIG. 15 is another perspective view of the invention suspension assembly of FIG. 13 with the wheel turned to the left.

FIG. 13 is a perspective view of the suspension assembly 10 of the invention wheel shown without the external tube 200 used in the prior art FIGS. 10-12. FIG. 14 is another perspective view of the invention suspension assembly 10 of FIG. 13 with the wheel 130 turned to the right without the external tube 200 of the prior art. FIG. 15 is another perspective view of the invention suspension assembly 10 of FIG. 13 with the wheel 130 turned to the left without the external tube 200 of the prior art being used.

The main components of the air shock assembly can include metals such as but not limited to aluminum, stainless steel, and the like. The airbag can be a durable bladder material, and the like.

Although the invention describes machining the passageways, the air lines can be formed from other techniques such as but not limited to drilling into the components, cutting into the components, and the like. Additionally, the airline can include extra internal tubing, and the like to provide additional sealing capability.

While the preferred embodiment describes the invention as being attached to luxury sport utility vehicles such as Land Rovers®, the invention can be applied to and used with other type of vehicles that use air bags with upper mounts and bearings Although the invention uses the air suspension system with air, the invention can be used with other fluids, such as but not limited to other types of gases, liquids, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A height adjustable fluid suspension system for vehicles, comprising:
   an upper mount for being fixably attached to a frame of vehicle;
   a rotatable lower mount for being attached to a wheel on the vehicle, so that when the wheel is turned the lower mount rotates with the wheel, and the upper mount stays fixably attached to the frame of the vehicle;
   an adjustable airbag having a closed bottom and closed sidewalls and an upper opening for allowing air to move into and out of the airbag, the airbag being attached between the upper mount and the lower mount, the airbag being adjustably inflated and deflated for raising and lowering the vehicle over ground surfaces; and
   an internal airline having an external input end, with the air line running through the upper mount and into the opening of the airbag, wherein compressed air passes from the external input end through the upper mount and into the airbag, wherein the height adjustable suspension system has no external airline or air tube.

2. The height adjustable fluid suspension system of claim 1, wherein the vehicle is a sport utility vehicle.

3. The height adjustable fluid suspension system of claim 1, wherein the internal air line is solely machined through the upper mount.

4. The height adjustable fluid suspension system of claim 1, wherein the upper mount includes:
   a top mount member for being fixably attached to the frame;
   a piston fixably attached to an upper end of the airbag;
   rotating members for allowing the piston to rotate relative to the top mount member, so that when the wheel turns the piston rotates with the wheel; and
   sealing members for providing an airtight seal between the airbag and the upper mount when the lower mount and the piston rotates with the wheel.

5. The height adjustable fluid suspension system of claim 4, wherein the rotating members include ball bearings.

6. The height adjustable fluid suspension system of claim 4, wherein the sealing members include: O-rings.

7. The height adjustable fluid suspension system of claim 1, wherein the internal air line includes a horizontal passage and a vertical passage.

8. The height adjustable fluid suspension system of claim 7, wherein the horizontal passage includes a diameter of approximately 0.160 inches, and the vertical passage includes a diameter of approximately 0.094 inches.

9. A height adjustable fluid suspension system for vehicles, consisting of:
   a fixed upper mount for being fixably attached to a frame of a sport utility vehicle, wherein the upper mount has a top mount member for being fixably attached to the frame;
   a rotatable lower mount for being attached to a wheel on the vehicle, so that when the wheel is turned the lower mount rotates with the wheel, and the upper mount stays fixably attached to the frame of the vehicle;
   an adjustable airbag having a closed bottom and closed sidewalls and an upper opening for allowing air to move into and out of the airbag, the airbag being attached between the upper mount and the lower mount, the airbag being adjustably inflated and deflated for raising and lowering the vehicle over ground surfaces;
   a piston fixably attached to an upper end of the airbag;
   rotating members for allowing the piston to rotate relative to the upper mount;
   sealing members for providing an airtight seal between the airbag and the upper mount; and
   an internal airline machined into the upper mount having an external input end and a horizontal passage with a diameter and a vertical passage with a diameter, the diameter of the horizontal passage being larger than the diameter of the vertical passage, with the internal air line running through the upper mount and into the opening of the airbag, wherein compressed air passes from the external input end into the internal air line through the upper mount and into the airbag, and wherein the height adjustable suspension system has no external airline or air tube.

10. The height adjustable fluid suspension system of claim 9, wherein the rotating members include ball bearings, and the sealing members include O-rings.

11. A method of adjusting fluid suspensions in a vehicle, comprising the steps of:
   providing a four wheeled vehicle with a frame having height adjustable suspension;
   providing height adjustable fluid suspension devices for each wheel, the height adjustable fluid suspension devices having pistons;
   fixably attaching upper ends of the suspension devices to the frame of the vehicle;
   rotatably attaching the pistons to the upper ends of the fluid suspension devices so that when the wheels are turning the pistons rotate with the turning wheels;
   sealing the pistons to the upper ends of the fluid suspension devices;
   attaching an upper end of airbags to the pistons;
   attaching lower ends of the airbags to lower mounts;
   attaching the lower mounts to each of the wheels so that when the wheels turn the lower mounts rotate with the turning wheels; and
   inflating and deflating the airbags by passing air through the upper ends and the pistons of the air suspension devices into the airbags without any external air lines or air tubes located outside of the upper ends and the pistons.

12. The method of claim 11, further comprising the step of:
   machining an air line through the upper ends and the pistons of the air suspension devices to provide air passageways into the air bags.

13. The method of claim 12, wherein the machining step includes the steps of:
   machining a horizontal passageway and a vertical passageway.

14. The method of claim 11, wherein the step of rotatably attaching include the step of:
   providing ball bearings between the pistons and the upper ends of the air suspension devices.

15. The method of claim 11, wherein the step of sealingly attaching includes the step of:
   providing O-rings between the pistons and the upper ends of the air suspension devices.

* * * * *